3,167,522
FILM-FORMING COMPOSITION
Harold D. Shulman, Philadelphia, Pa., assignor to Allegheny Steel Corporation, Upper Darby, Pa., a corporation of Delaware
No Drawing. Filed Jan. 6, 1964, Ser. No. 336,065
6 Claims. (Cl. 260—17.4)

This invention relates to film-forming compositions and, more particularly, to such compositions adapted for sealing voids of rubber compositions.

It is well known that natural and synthetic rubbers, as in the form of rubber tires, are susceptible to rupture such that the rubber is pervious to flow of air or other materials therethrough. For example, with vehicle tires, the tires and tubes used therewith can be pierced by sharp objects with resulting loss of air. Rather than dispose of the damaged tire and/or tube, sealants have been used to repair the damage. Today, with high speed, non-stop driving for extended periods, as on turnpikes and the like, high temperatures are developed in the tires and tubes. Additionally, temperature ranges to which tires and tubes are subjected range to as low as −50° C. in some northern and mountainous areas of the United States and Canada. It is apparent then, that a sealant is exposed to a wide range of conditions and must be effective under such conditions in order to insure safe operation of the vehicle equipped with tires and tubes repaired therewith. Tubeless tires which are bonded to a vehicle wheel with a sealant, are exposed to the same conditions and the sealant is similarly tested severely. The present invention is directed to sealants capable of withstanding rigorous operating conditions.

It is an object of this invention, therefore, to provide film-forming compositions effective over a wide range of operating conditions. It is another object of the invention to provide film-forming compositions for sealing a void in a rubber. Another object of the invention is to provide a sealant or adhesive for bonding rubber to another surface such as metal, wood and the like. Another object of the invention is to provide a liquid compound which may be inserted into a tire which will prevent flat tires caused by punctures. A still further object of this invention is to provide a new and novel tire sealant which will spread evenly throughout the entire tread area of a tire during normal driving conditions so as to maintain the balance of the tires.

A still further object of this invention is the provision of a new and better tire sealing composition which will not lose its effectiveness over long periods of time. Still another object of the invention is to provide a process for forming the film-forming compositions. Additional objects of the invention will be apparent from the following description.

The film-forming compositions of this invention comprise (a) A condensation product of monohydric aromatic compound and an urea,
(b) A product having adhesive and film-forming properties,
(c) A water insoluble film-forming product,
(d) A fibrous filler, and
(e) Water.

As indicated, one component of the compositions contemplated herein is a condensation product. This is formed by a monohydric aromatic compound and particularly an alkyl-substituted phenol. Outstanding is para-tertiary amyl phenol. Condensed with the aromatic compound is an urea, the latter term being used broadly inclusive of ureas and thioureas. Diisopropyl thiourea has been found to be particularly advantageous. An acid catalyst is used in forming the condensation product. Inorganic acids, such as nitric acid, have been found to be most satisfactory. While the condensation product, or a mixture of two or more of the same, can be used in the compositions of this invention, it is preferred that the product be formed in situ. In the preferred procedure, an excess of the phenolic material is used in order that it act as a fungicide or bactericide. Thus, the phenolic material inhibits formation of bacteria which normally attack a dextrin.

Another component of the new compositions is a dextrin, namely, an intermediate product formed during degradation of starch. Outstanding is dextrin dl gum. The dextrin dl gum is outstanding for its adhesive and film-forming properties. Although other film-forming adhesive gums may be utilized in accordance with the principles of the present invention the dextrin dl gum has been found especially effective over long periods of use.

A water insoluble partially hydrolyzed polyvinyl acetate is extremely tacky and cohesive and has excellent film-forming characteristics. Additionally, the water insoluble partially hydrolyzed polyvinyl acetate improves the water resistance of the dextrin as it dries. Thus, it prevents the dextrin from dissolving in water after a dry film has been formed when the sealant fills a puncture in a tire. Thus, the dextrin will not be affected when the tire is driven in wet conditions.

Serving as a filler in the new compositions is an inorganic fibrous material, such as asbestos. Asbestos has been particularly preferred since it retards the generation of heat in a tire during normal use. The heat normally found in a tire adversely effects the rubber. By utilizing the sealant in a standard tire, it is possible to run a tire cooler than normal.

Water is another component of the invention.

While compositions formed of the foregoing components are excellent sealants for rubber and the like, it has been found that further improvement is realized by including still additional ingredients in the new compositions. One such ingredient is a vinyl pyrrolidone-vinyl acetate copolymer, which is an extremely effective adhesive. Another material cooperating to impart superior adhesive qualities is sucrose acetate isobutyrate. A glycol such as ethyl glycol, dipropyl glycol or triethyl glycol, i.e., a high molecular weight glycol, is used to aid in wetting the filler (such as asbestos); the glycol also imparts anti-freeze properties to the new compositions. Further, the condensation product of a monohydric aromatic compound and an urea discussed previously inhibits the action of the glycol which would normally tend to soften the vulcanized rubber of the tire, thus increasing the efficiency of the tire sealant for long uses.

The new composition is used in liquid form. Thus, it is not a sticky or gummy substance as it contains no latex. It is an asbestos base material. Thus, it can be washed off the hands or out of the interior of the tire with ordinary water. Further, it does not clog the inner valve to the tire nor does it effect the core in the valve due to the rust inhibiting properties thereof. Further, it cannot freeze due to the anti-freeze properties of the glycol. Since the composition is intended to remain in the static air of a tire, no chemical change or evaporation will take place while the composition remains in the tire. When a punctured object enters the tire, the composition seals around the object and prevents the loss of air. The film-forming properties and the adhesive nature of the composition creates a strong portion of the tire which will not rupture under normal conditions. Should the punctured object be removed from the tire, the composition will seal the puncture as the tire rolls. Further, the composition which enters the puncture will not be effected by water or other weather conditions and will wear with the tire.

As indicated above, the new compositions are particularly adapted for sealing voids in natural or synthetic rubbers. As is well known, natural rubber comprises primarily the cis polymer of isoprene. Typical synthetic rubbers with which the new compositions can be used effectively are: butadiene-styrene copolymers (GRS); isobutylene-isoprene copolymers (butyl rubber); polychloroprene (neoprene); butadieneacrylonitrile copolymers (nitrile rubber); and the like. The present invention is more fully described and exemplified in the following example. It is to be understood, however, that the invention is not to be limited to any specific form of material or conditions set forth in the example, but is limited solely by the description in the specification and the claims. All quantities are expressed in parts by weight unless otherwise indicated. It is also to be understood that the proportions and conditions given represent the best embodiment known to date of the invention, but that other proportions and conditions can also be used.

*Example*

A film-forming composition was prepared from the following materials. Unless otherwise indicated, agitation was used throughout the preparation.

|  | Parts |
|---|---|
| Diisopropyl thiourea | 2.5 |
| Para-tertiary amyl phenol | 2.2 |
| Nitric acid | 0.1 |
| Dextrin dl gum | 17.0 |
| Sucrose acetate isobutyrate | 1.5 |
| Vinyl pyrrolidone-vinyl acetate copolymer | 3.5 |
| Water insoluble partially hydrolyzed polyvinyl acetate copolymer | 4.2 |
| Asbestos | 9.0 |
| Glycol | 25.0 |
| Isopropyl alcohol | 3.4 |
| Water | 30.9 |
| Sodium nitrite | 0.5 |
| Sodium chromate | 0.2 |

The products mentioned above can vary over the following ranges: Asbestos 6% to 14%; glycol 20% to 35%; water 20% to 50%; dextrin dl gum 12% to 25%; vinyl pyrrolidone-vinyl acetate copolymer 2% to 6.5%; water insoluble partially hydrolyzed polyvinyl acetate 2% to 6.5%; sodium nitrite .2% to .7%; and sodium chromate .2% to 2%.

The preferred formula is prepared in the following manner:

The glycols were heated to about 160° F. The diisopropyl thiourea was added to the glycols maintained at about 160° F. Para-tertiary amyl phenol was then added and the resulting mixture was maintained at about 160° F. until solution was substantially complete. Nitric acid in four (4) times its volume of water was added slowly to the said solution while maintaining about 160° F. The above steps must be followed exactly in order or else the result in the product is extremely brittle. This is especially true of the temperature which must be held within 2° F. of 160° F., or the product is useless. The sucrose acetate isobutyrate was then added rapidly. The resulting product was then cooled to 80–90° F. whereupon the water insoluble partially hydrolyzed polyvinyl acetate was added thereto in the form of an aqueous ammoniacal dispersion of pH 10.5. The mixture so formed, identified as A, was cooled to about 70° F. Any residual acidity can be neutralized with caustic soda or the like.

An aqueous solution containing the sodium nitrite and chromate was formed at about 70° F. Dextrin dl gum was added to the aqueous solution, with agitation being increased. The vinyl pyrrolidone-vinyl acetate copolymer was then added, followed by slow addition of asbestos. The above three steps can be performed in any order. However, the next steps must be done in the order recited. That is, the resulting dispersion of the above three steps was heated to about 100° F., whereupon mixture A was added slowly thereto. The glycol acted to wet the asbestos for ease in suspending it in the solution. The product so formed was agitated for about two (2) hours at about 100° F. The product was cooled to about 70° F. and was packaged.

It has been found that the product is an effective rubber sealant, withstanding without deterioration a wide range of conditions of use. Homogenization of the product would materially increase its effectiveness in view of the increased uniformity of the composition. In addition to sealing the punctures in a tire, when the composition is utilized in a tubeless tire, it seals any openings between the tire and the rim.

Although the present invention has been described and illustrated with reference to the specific examples, it is to be understood that modifications and variations of composition and procedure may be made by those skilled in the art within the principle and scope of the invention as expressed in the appended claims.

I claim:

1. A process for forming a film-forming composition comprising:
   (a) heating a glycol to about 160° F.,
   (b) adding a monohydric aromatic compound to said heated glycol of (a) at about 160° F., and mixing the same,
   (c) adding to the solution of (b) a water insoluble partially hydrolyzed polyvinyl acetate,
   (d) adding to the product formed in (c) an aqueous dispersion containing a dextrin and an inorganic, fibrous filler.

2. The composition formed by the process of claim 1.

3. A process for preparing a film-forming composition comprising about 6 to 14 percent by weight of the total composition of asbestos, 20 to 35 percent by weight of the total composition of glycol, 20 to 50 percent by weight of the total compositon of water, 12 to 25 percent by weight of the total composition of dextrin dl gum, 2 to 6.5 percent by weight of the total composition of vinyl pyrrolidone-vinyl acetate copolymer, 2 to 6.5 percent by weight of the total composition of water insoluble partially hydrolyzed polyvinyl acetate, .2 to .7 percent by weight of the total composition of sodium nitrite, .2 to 2 percent by weight of the total composition of sodium chromate, 2.5 percent by weight of the total composition of diisopropyl thiourea, 1.5 percent by weight of the total composition of sucrose acetate isobutyrate, and 2.2 percent by weight of the total composition of para-tertiary amyl phenol, which process comprises:
   (a) heating said glycol to about 160° F.,
   (b) adding said diisopropyl thiourea to said heated glycol of (a) at about 160° F. and mixing the same,
   (c) adding said para-tertiary amyl phenol to the mixture formed in (b) at about 160° F. and mixing the same to form a homogeneous reaction mixture,
   (d) adding slowly said nitric acid to said reaction mixture formed in (c) at about 160° F. and mixing the same,
   (e) adding said sucrose acetate isobutyrate to the mixture formed in (d) at about 160° F. and mixing the same,
   (f) cooling the mixture formed in (e) to about 80° F. to 90° F. and adding thereto said polyvinyl alcohol-polyvinyl acetate copolymer solution having a pH of about 10.5,
   (g) cooling the reaction mixture formed in (f) to about 70° F., and
   (h) adding the reaction mixture formed in (g) to a dispersion formed by
      (1) forming an aqueous dispersion containing said sodium nitrite, said sodium chromate, said dextrin dl gum and said vinyl pyrrolidone-vinyl acetate copolymer, (2) adding said asbestos slowly to said dispersion formed in (1) and mixing the same, (3) heating the dispersion formed in (2) to about 100° F., and thoroughly admixing said reaction mixture and said dispersion.

4. The composition formed by the process of claim 3.

5. A process for preparing film-forming composition comprising about 2.5 parts by weight diisopropyl thiourea, 2.2 parts by weight para-tertiary amyl phenol, 0.1 part by weight nitric acid, 17.0 parts by weight dextrin dl gum, 1.5 parts by weight sucrose acetate isobutyrate, 3.5 parts by weight vinyl pyrrolidone-vinyl acetate copolymer, 4.2 parts by weight water insoluble partially hydrolyzed polyvinyl acetate, 9.0 parts by weight asbestos, 25.0 parts by weight glycol, 3.4 parts by weight isopropyl alcohol, 30.9 parts by weight water, .5 part by weight sodium nitrite, and .2 part by weight sodium chromate, the sum of the above mentioned parts by weight forming the total composition, which process comprises:

(a) heating said glycol to about 160° F., (b) adding said diisopropyl thiourea to said heated glycol of (a) at about 160° F. and mixing the same, (c) adding said para-tertiary amyl phenol to the mixture formed in (b) at about 160° F. and mixing the same to form a homogeneous reaction mixture, (d) adding slowly said nitric acid to said reaction mixture formed in (c) at about 160° F. and mixing the same, (e) adding said sucrose acetate isobutyrate to the mixture formed in (d) at about 160° F. and mixing the same, (f) cooling the mixture formed in (e) to about 85° F. and adding thereto said water insoluble partially hydrolyzed polyvinyl acetate dispersion having a pH of about 10.5, (g) cooling the reaction mixture formed in (f) to about 70° F., and (h) adding the reaction mixture formed in (g) to a dispersion formed by, (1) forming an aqueous dispersion containing said sodium nitrite, said sodium chromate, said dextrin dl gum, and said vinyl pyrrolidone-vinyl acetate copolymer, (2) adding said asbestos slowly to said dispersion formed in (1) and mixing the same, (3) heating said dispersion formed in (2) to about 100° F., and thoroughly admixing said reaction mixture and said dispersion.

6. The composition formed by the process of claim 5.

References Cited by the Examiner
UNITED STATES PATENTS

| | | | |
|---|---|---|---|
| 2,667,462 | 1/54 | Wildish et al. | 260—17.4 |
| 2,739,639 | 3/56 | Neill et al. | 156—115 |
| 2,763,627 | 9/56 | Hagemeyer | 260—17.4 |
| 2,771,936 | 11/56 | Iknayan et al. | 156—115 |

References Cited by the Applicant
UNITED STATES PATENTS

| | | | |
|---|---|---|---|
| 2,036,825 | 4/36 | Pattman | 173—28 |
| 2,141,313 | 12/38 | Osgood et al. | 260—17.2 |
| 2,286,963 | 6/42 | Houser et al. | 106—33 |
| 2,296,948 | 9/42 | Pitman | 18—48 |
| 2,322,981 | 6/43 | Ubbelohde | 18—54 |
| 2,512,441 | 6/50 | Rouzet | 22—188 |
| 2,542,932 | 2/51 | Lolkema et al. | 260—17.2 |
| 2,555,058 | 5/51 | Rouzet | 260—17.2 |
| 2,590,013 | 3/52 | Huntzicker et al. | 154—45.9 |
| 2,676,172 | 4/54 | Roach et al. | 260—209 |
| 2,739,639 | 4/56 | Neill et al. | 154—9 |
| 2,756,801 | 7/56 | Iknayan et al. | 152—347 |
| 2,760,942 | 8/56 | Oakley | 260—17.2 |
| 2,771,936 | 11/56 | Iknayan et al. | 183—49 |
| 2,782,829 | 2/57 | Peterson et al. | 152—347 |
| 2,806,007 | 9/57 | Linn | 260—17.2 |
| 2,806,826 | 9/57 | Squire | 260—17.2 |
| 2,809,176 | 10/57 | Wenzelberger | 260—17.3 |
| 2,856,316 | 10/58 | Vangils | 117—98 |
| 2,875,088 | 2/59 | Stiehl et al. | 117—10 |
| 3,048,509 | 8/62 | Sweet et al. | 161—145 |
| 3,076,772 | 2/63 | Christ | 260—94.9 |

WILLIAM H. SHORT, *Primary Examiner.*